(12) United States Patent
Ernst

(10) Patent No.: US 11,696,564 B2
(45) Date of Patent: Jul. 11, 2023

(54) SEPARATION DEVICE FOR EMISSION REDUCTION IN STABLES AND ANIMAL STABLE

(71) Applicant: BIG DUTCHMAN INTERNATIONAL GMBH, Vechta (DE)

(72) Inventor: Alexander Ernst, Diepholz (DE)

(73) Assignee: BIG DUTCHMAN INTERNATIONAL GMBH, Vechta (DE)

( * ) Notice: Subject to any disclaimer, the term of this patent is extended or adjusted under 35 U.S.C. 154(b) by 633 days.

(21) Appl. No.: 16/658,712

(22) Filed: Oct. 21, 2019

(65) Prior Publication Data

US 2020/0120893 A1 Apr. 23, 2020
US 2021/0051915 A9 Feb. 25, 2021

(30) Foreign Application Priority Data

Oct. 22, 2018 (LU) .......................... 100969

(51) Int. Cl.
*A01K 1/02* (2006.01)
*A01K 1/01* (2006.01)

(52) U.S. Cl.
CPC .......... *A01K 1/0135* (2013.01); *A01K 1/0128* (2013.01); *A01K 1/02* (2013.01); *A01K 2227/108* (2013.01)

(58) Field of Classification Search
CPC .. A01K 2227/108; A01K 1/02; A01K 1/0128; A01K 1/0135
See application file for complete search history.

(56) References Cited

U.S. PATENT DOCUMENTS

| 502,004 | A | * | 7/1893 | Logan | A01K 1/015 |
| | | | | | 119/527 |
| 1,090,131 | A | | 3/1914 | Bowditch | |
| 1,159,129 | A | | 11/1915 | Tellefson | |
| 1,177,695 | A | * | 4/1916 | Gable | A01K 1/0135 |
| | | | | | 119/451 |
| 1,187,814 | A | * | 6/1916 | Carter | A01K 1/0128 |
| | | | | | 119/451 |
| 3,119,374 | A | * | 1/1964 | Ladner | A01K 1/0135 |
| | | | | | 482/61 |
| 3,274,973 | A | | 9/1966 | Woods et al. | |

(Continued)

FOREIGN PATENT DOCUMENTS

CN 101277747 10/2008
CN 108471718 3/2018

(Continued)

*Primary Examiner* — Monica L Perry
*Assistant Examiner* — Brittany A Lowery
(74) *Attorney, Agent, or Firm* — Price Heneveld LLP

(57) ABSTRACT

A separating device for forming a standing area for livestock, in particular pigs, and for reducing emissions in pens, in particular in pig pens, comprises a base frame, a drainage element with a plurality of drainage channels which each comprise an outflow end, and shoulders, between which the plurality of drainage channels extends orthogonally to a drainage direction, a liquid-permeable endless belt with an upper run and a lower run, wherein the drainage element is arranged on the base frame such that a drainage direction of the plurality of drainage channels is directed in the direction of the outflow end.

18 Claims, 10 Drawing Sheets

(56) References Cited

U.S. PATENT DOCUMENTS

| | | | | |
|---|---|---|---|---|
| 3,611,472 A * | 10/1971 | Lee | ............... | A01K 1/015 |
| | | | | 15/309.1 |
| 4,353,328 A | 10/1982 | Steidinger | | |
| 4,402,282 A * | 9/1983 | Steidinger | ............ | A01K 1/0103 |
| | | | | 119/447 |
| 5,477,654 A * | 12/1995 | Weelink | ............ | A01K 1/01 |
| | | | | 119/451 |
| 5,817,241 A * | 10/1998 | Brayboy | ............ | A01K 1/0103 |
| | | | | 210/800 |
| 11,277,999 B2 | 3/2022 | Remmert | | |
| 2017/0208771 A1 * | 7/2017 | Craig | ............ | C12P 5/023 |
| 2020/0029527 A1 | 1/2020 | Tobergte et al. | | |

FOREIGN PATENT DOCUMENTS

| | | | | |
|---|---|---|---|---|
| DE | 102016000308 | | 3/2017 | |
| DE | 102016013326 | | 5/2018 | |
| EP | 1377158 | | 1/2004 | |
| EP | 1678059 | | 7/2006 | |
| EP | 3598892 | | 1/2020 | |
| WO | 0243472 | | 6/2002 | |
| WO | 2007016758 | | 2/2007 | |
| WO | 2013048333 | | 4/2013 | |
| WO | 2017121864 | | 7/2017 | |
| WO | WO-2017121864 A1 * | | 7/2017 | ............ A01K 1/0103 |

\* cited by examiner

SEPARATION DEVICE FOR EMISSION REDUCTION IN STABLES AND ANIMAL STABLE

CROSS-REFERENCE TO FOREIGN PRIORITY APPLICATION

The present application claims the benefit under 35 U.S.C. §§ 119(b), 119(e), 120, and/or 365(c) to Luxembourg Application No. LU 100969 filed Oct. 22, 2018.

FIELD OF THE INVENTION

The invention relates to a separating device for forming a standing area for livestock, in particular pigs, and for reducing emissions in pens, in particular in pig pens, to an animal pen, in particular pig pen, and to a method for separating dung and urine in an animal pen.

BACKGROUND OF THE INVENTION

Animals, in particular pigs, are regularly held on what are referred to as slatted floors. A slatted floor has a multiplicity of slats, and therefore liquid and solid excrement of the animals held on the slatted floor are disposed of through the slats. The disposal takes place through the slats and by subsequent conducting away of the liquid and solid excrement in a region below the slatted floor. This results in a mixture of solid and liquid excrement, which is also called slurry, arising below the slatted floor.

Slurry regularly leads to problems with smell, disposal, and/or animal welfare. The problems result, in particular, from ammonia pollution of the pen. Ammonia arises from urea of animal excrement by means of hydrolysis, wherein nitrogen excessively absorbed by the livestock is for the most part excreted in the form of urea in the urine and is converted by the enzyme urease into ammonia. The enzyme urease is excreted with the dung. A considerable emission of ammonia regularly arises in pig pens. It is endeavored to reduce the ammonia emission from animal pens because of animal welfare aspects, because of regulations, and also because of the protection of local residents. Air washing systems which use acid baths to free the air of dust and ammonia are known. However, this results in the ammonia pollution within the pen remaining as high as it would be even without air washing since only the air blown out of the pen is washed. Air washing, therefore, merely addresses the environment of the pen, but essentially does not address the climate within the pen. Ammonia is a pungent, colorless, and poisonous gas which irritates the mucous membranes of humans and animals and causes tears. Furthermore, ammonia when breathed in can cause dry coughs and nausea.

For animal welfare aspects, the animals inside the pens are increasingly provided with manipulable material which can be composed, for example, of natural materials, such as hay, straw, lucerne, sawdust, or pellets of the abovementioned or of further materials. By the animals being occupied with the available materials on, for example, a slatted floor, dung, urine, and the manipulable material become mixed, which results overall in forming slurry and, in consequence, leads to an increased solids portion in the slurry. Such slurry can lead to the slurry system no longer being able to carry out its function, at least in the designated manner, or in failing. The slurry is then no longer stirrable and/or pumpable and/or can no longer be deposited. Current husbandry systems which function with a slurry system have limits on the use of manipulable material which is used by the animals.

DE 10 2016 000 308 A1, DE 10 2016 013 326 A1 and WO 2017/121864 A1 disclose a pen with a defecation region, the floor of which is a conveyor belt. The conveyor belt has a certain inclination such that the liquid excrement can drain off counter to a conveying direction of the dung.

WO 2007/016758 A1 discloses a system with which the liquid and solid excrement can be separated in an animal pen. An inclined conveyor belt is arranged under a slatted floor, said conveyor belt conveying the liquid excrement in one direction and the solid excrement in an opposite direction.

European patent application which has not yet been published at the filing date of the current application and has the application number EP18185476.1 discloses a straw bedded pen in which a straw mat is arranged which is produced by automatic strewing of straw.

Furthermore, EP 1 377 158 B1 discloses a device with a horizontally movable floor for keeping animals, wherein loading with a weight generates energy and said energy is used for advancing the floor. WO 2013/048333 and EP 1 678 059 B9 disclose solutions for the step-by-step driving of a pen floor designed as a conveyor belt. WO 02/43472 A1 discloses a pen floor which is designed as a conveyor belt, wherein the conveyor belt has a sensor arrangement at one end, by means of which the conveyor belt can be stopped. U.S. Pat. Nos. 1,090,131, 1,159,129 and 3,274,973 each disclose conveyor belts which are permeable to urine and have a dung scraper, in which dung and urine are separated.

SUMMARY OF THE INVENTION

The existing systems and methods for reducing ammonia pollution in animal pens afford various advantages, but further improvements are desirable. It is, therefore, an object of the present invention to provide a separating device for forming a standing area for livestock, in particular pigs, and for reducing emissions in pens, in particular in pig pens, an animal pen, in particular pig pen, and a method for separating dung and urine in an animal pen, which reduce or eliminate one or more of the disadvantages mentioned. In particular, it is an object of the invention to provide a solution which reduces ammonia pollution within an animal pen, in particular a pig pen. Furthermore, it is an object of the invention to provide a solution which is more reliable and/or more robust. Furthermore, it is an object of the invention to provide a solution which improves the maintainability.

This object is achieved by a separating device for forming a standing area for livestock, in particular pigs, and for reducing emissions in pens, in particular in pig pens, comprising a base frame, a drainage element with two or more drainage channels which each comprise an outflow end, and shoulders, between which in each case one of the two or more drainage channels extends orthogonally to a drainage direction, a liquid-permeable endless belt with an upper run and a lower run, wherein the drainage element is arranged on the base frame in such a manner that a drainage direction of the two or more drainage channels is directed in the direction of the outflow end, and the outflow end is positioned in such a manner that a liquid flowing out of the latter reaches a transverse drainage channel, wherein the drainage element is arranged between the upper run and the lower run, and wherein the upper run rests on at least one shoulder.

The base frame preferably forms an at least partially closed border, in particular a closed border. Furthermore, it is preferred for the base frame to be designed as a carrying structure. The base frame can have suitable fastening elements in order to fasten the drainage element. For example, the base frame can have a support element, preferably can have two or more support elements on which the drainage element is arranged.

The transverse drainage channel preferably comprises means for conducting a liquid, in particular a liquid column. Furthermore, said transverse drainage channel can have a, preferably inner, pipe. The transverse drainage channel is preferably designed in the shape of a channel, wherein this means, in particular, that it is designed as half of a pipe or a half pipe. Furthermore, the transverse drainage channel can have a U- and/or V-shaped profile. Furthermore, it is preferred for the transverse drainage channel to be formed by an arcuate and/or drawn metal sheet. The transverse drainage channel is preferably composed of metal, in particular steel, in particular of non-rusting steel, preferably stainless steel, or comprises said metal or steel. Furthermore, preferably, the transverse drainage channel is composed of plastic, in particular fiber composite plastic, or comprises the latter.

The drainage element has the two or more drainage channels. A drainage channel should be understood as meaning, in particular, an element through which a liquid can flow. The drainage channel is preferably a narrow and/or elongate element. The drainage channels are open upward, in particular, in the vertical direction, at least in sections, preferably completely. The drainage channel preferably extends from a blocking end to an outflow end in a channel longitudinal direction. The channel longitudinal direction is preferably oriented substantially parallel to the drainage direction. The blocking end is preferably designed in such a manner that a liquid located in the drainage channel cannot drain when the drainage channel is oriented horizontally. The outflow end is preferably designed in such a manner that a liquid located in the drainage channel can emerge out of the drainage channel when the drainage channel is oriented horizontally and/or when the drainage channel is inclined toward the outflow end, which means, in particular, that the liquid can drain and/or flow off. In a first preferred variant, the two or more drainage channels are not fluidically coupled to one another. In a further preferred variant, at least two of the two or more drainage channels are in fluidic contact. For example, a fluid can pass from a first drainage channel toward a second drainage channel of the two or more drainage channels.

The drainage channel has a channel cross section orthogonally with respect to the channel longitudinal direction and/or the drainage direction. The channel cross section can be semicircular, and/or rectangular, and/or semielliptical, and/or triangular. As will also be explained in more detail below, the channel cross section can also be U-shaped or V-shaped. The channel longitudinal direction and the drainage direction are preferably oriented parallel to each other.

The two or more drainage channels can be composed of metal, in particular of steel, in particular of a non-rusting steel, preferably stainless steel, or can comprise said metal or steel. In particular, it is preferred for the drainage channels to be produced from a semi-finished steel sheet product, in particular a semi-finished stainless steel sheet product. Furthermore, the two or more drainage channels can be composed of plastic or can comprise the latter. Fiber composite plastics are particularly preferably used. The drainage channels are preferably designed in such a manner that they can each be connected to one another, and, therefore, scalability can be achieved and the width of the drainage element can be adapted to a changed width of the separating device without substantial structural adaptations.

The drainage channels furthermore extend between shoulders. The extent between the shoulders is oriented orthogonally with respect to the drainage direction. In each case one drainage channel preferably extends between two shoulders. Two drainage channels arranged adjacent to each other preferably have a common shoulder therebetween.

The extent of a drainage channel between the shoulders is preferably oriented orthogonally with respect to the channel longitudinal direction. Furthermore, it is preferred for the extent of a drainage channel between the shoulders to be oriented orthogonally with respect to a channel depth. The channel depth represents, in particular, the direction of the filling height of one of the two or more drainage channels. The shoulders can be formed by the drainage channels. Additionally or alternatively, the shoulders can be formed by an additional shoulder element. The shoulder element is preferably arranged on, furthermore preferably fastened to, at least one drainage channel. As will also be explained in more detail below, the shoulder can be formed by adjacent drainage channels, for example, by an edge region of a drainage channel being tilted and/or bent and/or by the two adjacent drainage channels being welded to each other.

A filling level sensor is preferably arranged in at least one of the two or more drainage channels. The filling level sensor can detect, for example, clogging and/or potential clogging in the drainage channel itself or the drainage channels themselves or in a downstream outflow system.

The endless belt has the upper run and the lower run. For example, the upper run can be designed as a load run and the lower run as a return run, or vice versa. By means of suitable elements on the separating device, the endless belt can be designed to form a traction mechanism drive, for example, by deflecting units explained below.

The endless belt is designed to be liquid-permeable, wherein the endless belt is designed, in particular, to be permeable to urine. Liquid-permeable means, in particular, that a liquid located on the endless belt can pass through the endless belt. This can be achieved, for example, by a liquid-permeable material, for example, a fibrous material. Furthermore, the endless belt can have through openings. Furthermore, the liquid permeability can be realized by means of a multi-link endless belt, with spacings being provided between the links of the endless belt formed in such a manner. The spacings can be realized, for example, by a gap size between the links. A design of the endless belt as an endless belt which is not flexurally slack is particularly preferred. The endless belt is preferably designed in such a manner that it is substantially impermeable to dung of animals, in particular of pigs.

The drainage element is arranged on the base frame in such a manner that a drainage direction of the two or more drainage channels is directed in the direction of the outflow end. The drainage direction is, in particular, the direction in which a liquid located in one of the drainage channels flows. The two or more drainage channels are preferably inclined in such a manner that a liquid located therein flows in the direction of the respective outflow end. The previously defined drainage direction can be realized, for example, by an inclined arrangement of the two or more drainage channels on the drainage element. Alternatively or additionally, the drainage element can be arranged in an inclined manner on the base frame, wherein this is preferably made possible by supports arranged in a vertically offset manner and/or by cross members, explained below, on the base frame.

The base frame can also have supports and/or cross members at a vertically identical height, wherein the elements of the drainage element that rest on the supports and/or cross members have a vertically different spacing from the two or more drainage channels. The shoulders of the drainage element preferably extend in the horizontal direction, and, therefore, a substantially horizontally oriented upper run rests substantially completely on the shoulders. Horizontally oriented shoulders and inclined drainage channels preferably result in the filling height of the drainage channels increasing toward the outflow end.

Furthermore, it is preferred for the upper run to rest on two or more shoulders. Furthermore, the upper run can rest on three shoulders, and/or on four shoulders, and/or on five shoulders, and/or on six shoulders, and/or on seven shoulders, and/or on eight shoulders, and/or on nine shoulders, and/or on ten shoulders. In a further preferred design of the separating device, it is provided that the upper run rests on more than 10%, and/or on more than 20%, and/or on more than 25%, and/or on more than 50%, and/or on more than 75%, and/or on more than 90%, of the shoulders surrounded by the drainage element.

By means of the arrangement of the drainage element on the base frame, the outflow end is positioned in such a manner that a liquid flowing out of the outflow end reaches the transverse drainage channel and/or flows into the transverse drainage channel. This can be achieved, for example, by the outflow end being positioned in the vertical direction above the transverse drainage channel. In particular, the outflow end can be arranged in the vertical direction above a lower end of the transverse drainage channel in the vertical direction. Furthermore, the liquid can flow and/or can be brought from the outflow end toward the transverse drainage channel by means of suitable conducting elements.

The arrangement of the drainage element between the upper run and the lower run of the endless belt results, in particular, in that a liquid flowing through the upper run reaches the drainage element. Furthermore, the positioning of the drainage element between the upper run and the lower run creates the possibility of the upper run resting on at least one shoulder. The upper run serves, in particular, as a standing area for animals. As a result, the upper run is loaded by not insubstantial weights. By means of the support of the upper run on at least one shoulder, preferably on two or more shoulders, the endless belt is relieved of load. The weight of one, two, or more animals on the separating device is at least partially carried by at least one shoulder and, therefore, by the drainage element.

As a result, the demands on the endless belt are changed since the weights, to be absorbed by the endless belt, of animals on the separating device are distributed more homogeneously on supports located under the upper run of the endless belt, here the shoulders of the drainage channels. The endless belt can be formed, for example, with different hardness, which improves the running of the endless belt on the means for guiding the endless belt. Furthermore, the endless belt can be formed with a smaller thickness, and, therefore, the directional stability is improved. This results, in particular, in a lower energy consumption for operating the endless belt, and, therefore, the demands on a drive unit to be connected are reduced. Furthermore, the energy consumption can be reduced.

Furthermore, the selection of suitable endless belts is expanded since the demands on hardness and strength are reduced. Consequently, materials can be used for the endless belt that especially improve the animal welfare. For example, softer materials can be used which are particularly advantageous for the hooves of the animals.

The separating device furthermore has the advantage that it can be placed on a plane and does not make any demands in respect of an inclined underlying surface. As a result, the structural measures are low or are not increased in comparison to a conventional pen.

The separating device described here is based inter alia on the finding that the endless belt is a wearing part, but failure of the endless belt has to be substantially completely avoided since, in the event of failure, animals located thereon could be injured. As a result, the endless belt is conventionally formed robustly and/or corresponding maintenance cycles are provided in such a manner that failure is ruled out.

The separating device described previously reduces the loading of the endless belt by means of shoulders acting as supports along the surface of extent of the upper run, as a result of which the endless belt can, for example, be less oversized and the maintenance cycles can be longer. Furthermore, the loading is more homogeneously distributed by the support on the shoulders, and, therefore, the separating device described herein is reliable and robust.

Furthermore, the maintainability is improved since the drainage element can be mounted in and dismounted from the base frame with comparatively little outlay. Furthermore, the structure is simplified since, in addition to the channels, no further supports or the like are required for the endless belt. The separating device described is thus less susceptible to repairs.

Furthermore, the animal welfare with the previously described separating device can be improved to the effect that a pen equipped with such a separating device has a greater receiving capacity for manipulable material, such as, for example, hay, straw, lucerne, and/or sawdust. This is, in particular, because the manipulable material on the separating device can be disposed of with the dung. Accordingly, a slurry system is not overloaded because of an excessive portion of solids in the slurry, which leads to more manipulable material being able to be introduced.

A preferred development of the separating device makes provision that the latter comprises a transverse drainage member, wherein the transverse drainage member preferably acts as a first support for the drainage element. Furthermore, it is preferred that the base frame has a transverse support member, wherein the transverse support member preferably acts as a second support for the drainage element. Furthermore, the base frame can comprise a first longitudinal member and/or a second longitudinal member, wherein the transverse drainage member and/or the transverse support member is or are arranged on the first longitudinal member and/or the second longitudinal member.

The transverse drainage member is preferably designed in such a manner that it at least partially carries or can carry the weight of the drainage element. Furthermore, the transverse drainage member is preferably designed in such a manner that it can carry the weight of the drainage element and also the weight of one, two, or more animals, in particular pigs. The transverse drainage member can be dimensioned, for example, in such a manner that it can carry a weight of greater than 100 kg, greater than 150 kg, greater than 200 kg, greater than 250 kg, greater than 300 kg, greater than 500 kg and/or greater than 1000 kg.

The transverse support member is preferably spaced apart from the transverse drainage member along the drainage direction. The transverse support member is preferably arranged in the vertical direction at the same height as the transverse drainage member. Furthermore, it is preferred that the drainage element has a first supporting element and/or a second supporting element. The supporting elements preferably connect the drainage channels to one another. The supporting elements are preferably designed as bars and/or as hollow profiles with an elongate design. The supporting elements preferably extend in their main direction of extent parallel to the transverse drainage member and/or transverse support member. In a preferred variant embodiment, the supporting elements are designed in such a manner that they can be arranged on the transverse drainage member and/or on the transverse support member, and preferably can be held by said members.

The longitudinal members preferably extend with their main direction of extent substantially parallel to the drainage direction. The transverse drainage member and/or the transverse support member preferably extends or extend orthogonally with respect to the longitudinal member or the longitudinal members. Furthermore, preferably, the transverse drainage member and/or the transverse support member are or is arranged between the first longitudinal member and the second longitudinal member.

The first longitudinal member and/or the second longitudinal member preferably have or has a drainage opening which is designed, in particular, as a through opening. The transverse drainage channel preferably leads into the drainage opening, and, therefore, a liquid trapped by the transverse drainage channel can escape from the separating device through the drainage opening. For example, a disposal of the liquid can be provided at the drainage opening. The draining opening can have, for example, a diameter of 30 mm to 50 mm.

In a preferred variant embodiment of the separating device, it is provided that the endless belt is designed as a module belt with a multiplicity of modules arranged on one another, and wherein the endless belt has a degree of opening of 2% to 10%, in particular 2% to 8%, preferably 2% to 6%, particularly preferably of 2% to 6%, in particular 3% to 5%. Furthermore, preferably, the module belt has a gap size of 0.2 mm to 1.0 mm, in particular 0.2 mm to 0.8 mm, preferably 0.2 mm to 0.6 mm, furthermore, preferably 0.2 mm to 0.5 mm, in particular 0.3 mm to 0.4 mm, preferably 0.34 mm to 0.36 mm, in a substantially rectilinear portion of the endless belt.

The degree of opening is defined, in particular, as the ratio of open areas and closed areas of the endless belt. An open area is, for example, a gap or a passage opening, i.e., a region through which a liquid can pass through the endless belt. At the reversal points of the endless belt and in regions of the endless belt abutting the reversal points, the endless belt is generally in a non-rectilinear state since it is curved. As a rule, the gap sizes change in said regions. An endless belt designed as a module belt has the advantage of a specifically definable degree of opening. Furthermore, a module belt is distinguished by high strength and durability. Furthermore, the module belt can be formed, in particular, in a slip-proof manner, as a suitable underlying surface for animals using simple means.

The modules arranged on one another preferably have a module longitudinal direction, a module width, and a module thickness. The module longitudinal direction and the module width extend, in particular, between the reversal points of the endless belt, preferably in a planar plane of the module belt. The module longitudinal direction is preferably oriented orthogonally with respect to the advancing direction of the endless belt. The module width is preferably oriented parallel to the advancing direction of the endless belt.

In a particularly advantageous refinement, a module has a module thickness of less than or equal 20 mm, preferably less than or equal to 15 mm, furthermore preferably less than or equal to 14 mm, furthermore preferably less than or equal to 13 mm, particularly preferably less than or equal to 12 mm, and particularly preferably less than or equal to 11 mm, and preferably less than or equal to 10 mm. The modules are preferably hingedly connectable on their longitudinal sides, which run parallel to the module longitudinal direction, to further modules in each case. Adjacently arranged modules preferably have a hinge connection. A hinge axis of the hinge connection is preferably arranged centrally with respect to the module thickness. The hinge connection is preferably designed in the manner of a tooth and/or comprises hinge teeth. The modules are connected to one another, in particular, in such a manner that the hinge teeth of a first module grip into a tooth base of a second module. The teeth have a through opening and/or recesses preferably parallel to the module longitudinal direction. The teeth and/or the through openings and/or recesses are preferably arranged and designed in such a manner that the through openings of two adjacent modules have a common passage axis. A rod, for example, can be arranged in said through openings with a common passage axis such that the adjacent modules are connected to one another.

The material of the endless belt is preferably flame-retardant and/or antistatic. The endless belt is preferably composed of plastic or comprises the latter. In particular, it is preferred that the plastic is selected from the group consisting of polyethylene, polypropylene, polyoxymethylene, polyamides, polyphthalamides, polybutylene terephthalate and polyurethanes. In an advantageous development, the plastic used contains fibers.

Protective elements are preferably arranged in regions abutting the reversal points of the endless belt. The protective elements prevent an animal from stepping onto the region of the reversal points, which have only a low load-bearing capacity if any at all. The protective elements can be designed, for example, as a module belt support and/or as a plate. Furthermore, the protective elements can have brushes in order to compensate for unevennesses.

According to a further preferred variant embodiment of the separating device, it is provided that the transverse drainage channel is arranged on the drainage element, wherein a liquid located in the two or more drainage channels flows into the transverse drainage channel. Furthermore, the transverse drainage channel can be arranged on the transverse drainage member and/or the transverse drainage channel can be formed integrally with the transverse drainage member. Furthermore, it is preferred that the transverse drainage channel is arranged in an inclined manner. The transverse drainage member preferably has a channel-shaped depression which forms the transverse drainage channel.

A further preferred development of the separating device is distinguished in that the substantially flat portion of the upper run is designed as a standing area for livestock, in particular pigs, and the drainage element extends completely under the standing area. Such a design permits the substantially complete trapping of liquid deposited on the upper run.

The endless belt is preferably driven by a geared motor, in particular, an electric geared motor. The advancing speed of the endless belt can be between 1 m/min and 10 m/min, preferably between 1 m/min and 5 m/min, particularly preferably between 1.5 m/min and 2.5 m/min.

In a preferred variant embodiment of the separating device, it is provided that the base frame extends from a first end to a second end and a first deflecting unit is arranged at the first end and a second deflecting unit is arranged at the second end, and the endless belt loops around the first deflecting unit and the second deflecting unit. The reversal points of the endless belt are therefore preferably positioned on the deflecting units. The first deflecting unit and/or the second deflecting unit preferably has or have a drive shaft. The drive shaft can be, for example, in the form of a square tube having a rectangular and/or square cross section.

The drive shaft can comprise a pinion for a gearwheel drive and/or a drive pulley for a belt drive. The drive shaft is preferably telescopic. The first deflecting unit and/or the second deflecting unit can comprise coupling elements which are arranged and designed to couple a driven deflecting unit to a third deflecting unit of an adjacent separating device. The coupling can comprise, for example, a chain coupling in order, in particular, to compensate for play. This affords the advantage that only a single separating device within a pen has to be driven and the further separating device are driven by means of the driven separating device.

Furthermore preferably, the first and/or second deflecting unit comprise or comprises a drive. The drive can be designed, for example, as a geared motor or can comprise the latter. The drive can be provided integrally, for example, in the form of a roller motor or tubular motor or connect externally on one end of the drive shaft. The advancing direction carried out by the endless belt is preferably parallel to the drainage direction. Furthermore, it is particularly preferred that the advancing direction and the drainage direction are directed in the same direction. One of the deflecting units can, in particular, be driven, with the other being arranged passively with respect to the deflection.

In a further particularly preferred variant embodiment of the separating device, it is provided that the two or more drainage channels each have a channel cross section orthogonally with respect to the drainage direction and the channel cross section has a U-shaped profile and/or a V-shaped profile. The two or more drainage channels preferably each have two limbs which extend away from a channel base. The limb ends facing away from the channel base preferably extend away from the channel base in the vertical direction.

Furthermore, it is preferred that the U-shaped profile has a radius of smaller than 400 mm, and/or smaller than 300 mm, and/or smaller than 250 mm, and/or smaller than 200 mm, and/or smaller than 194 mm, and/or smaller than 190 mm, and/or smaller than 175 mm, and/or smaller than 150 mm, and/or smaller than 100 mm, and/or smaller than 75 mm, and/or smaller than 50 mm, and/or smaller than 25 mm, and/or smaller than 15 mm, and/or smaller than 10 mm, and/or smaller than 5 mm.

Furthermore, the V-shaped profile can have an inner opening angle of smaller than 180 arc degrees, and/or smaller than 170 arc degrees, and/or smaller than 162 arc degrees, and/or smaller than 150 arc degrees, and/or smaller than 140 arc degrees, and/or smaller than 130 arc degrees, and/or smaller than 120 arc degrees, and/or smaller than 100 arc degrees, and/or smaller than 90 arc degrees, and/or smaller than 45 arc degrees.

Furthermore, it is preferred that the two or more drainage channels have a bead in the drainage direction, wherein a base of the bead furthermore preferably has a radius and/or a tilted profile. In particular, profiles in which a liquid collects with as small a surface as possible or the liquid is bunched are preferred. With such a profile, the flow speed can be positively influenced. Furthermore, the odor pollution is lower. Furthermore, a reduced evaporation surface results.

According to a further preferred variant embodiment of the separating device, it is provided that a shoulder between a first drainage channel of the two or more drainage channels and a second drainage channel of the two or more drainage channels is formed by a first edge portion of the first drainage channel and a second edge portion of the second drainage channel. In particular, the first edge portion can be arranged above the second edge portion, wherein the first edge portion and/or the second edge portion is or are buckled and/or bent along a longitudinal direction, in particular, the channel longitudinal direction. The first edge portion and/or the second edge portion is or are preferably formed in the channel longitudinal direction. The first edge portion is preferably connected to the second edge portion. This connection can take place in an integrally bonded or force-fitting manner. In particular, the edge portions can be welded to one another.

A further preferred development of the separating device is distinguished in that a first outer drainage channel of the two or more drainage channels faces the first longitudinal member with a first outer edge portion, and a second outer drainage channel of the two or more drainage channels faces the second longitudinal member with the second outer edge portion, and the first outer edge portion and/or the second outer edge portion is or are arranged and designed to rest on the first longitudinal member and/or the second longitudinal member, wherein the first outer edge portion and/or the second outer edge portion is or are preferably buckled and/or bent over. The edge portions arranged on the longitudinal member support the drainage element on the base frame, and, therefore, the stability is increased. There is the option of placing the drainage element into the base frame, with active fastening possibly not being required.

In a further particularly preferred development of the separating device, it is provided that the latter comprises a dung scraper. The dung scraper preferably acts on the endless belt at one of the reversal points of the endless belt and/or on regions abutting one of the reversal points. In particular, it is preferred that the dung scraper is designed in such a manner that the latter leaves residual dung on the endless belt. This can be realized, for example, by means of application of spring force. The residual dung on the endless belt enables animals, in particular pigs, to perceive the separating device as a preferred region for defecation and enables the rest of the pen or of the movement regions to preferably be kept free from dung.

In a preferred variant embodiment of the separating device, it is provided that the latter comprises a control device which is arranged and designed to control a drive of the endless belt. Furthermore, preferably, the separating device comprises at least one sensor, selected from the group consisting of pressure sensor, weight sensor, moisture sensor, pH sensor, conductivity sensor, flow rate sensor, presence sensor, in particular light barrier, motion detector and camera, ultrasonic sensor, transponder-based sensor, ammonia content sensor, air humidity sensor, and temperature sensor, and wherein the control device is arranged and designed to control the drive as a function of one or more sensor signals of one or more of the sensors. The transponder-based sensor can be designed, for example, as an RFID chip and/or as an ear tag. Furthermore, it is preferred that the control device controls the drive depending on the time of day, and/or in a sensor-controlled manner, and/or as a function of the presence of animals.

According to a further preferred variant embodiment of the separating device, it is provided that the separating device comprises at least one cleaning nozzle which is arranged and designed to convey a liquid onto the lower run, wherein the cleaning nozzle is preferably arranged on the drainage element.

Furthermore, the base frame can have one, two, or more supporting feet. In particular, it is preferred that the supporting feet are arranged in such a manner that the position of the base frame is adjustable in relation to a horizontal. For this purpose, the supporting feet have a fixed element arranged fixedly on the base frame and an adjustment element arranged movably on the fixed element. The adjustment element can be, for example, telescopic such that said adjustment element can be moved out of the fixed element. The adjustment element is fastened to the fixed element, for example, via a latching system. Furthermore, a ball and socket joint can be arranged on the supporting foot or the supporting feet in order to permit an adjustment of the base frame in the vertical direction above a pen floor.

The separating device preferably comprises receptacles for the arrangement of transport means. For example, the transport device can have threaded openings into which transport lugs can be screwed.

According to a further aspect, the object mentioned at the beginning is achieved by an animal pen, in particular a pig pen, comprising at least one animal holding bay, a separating device according to one of the previously described variant embodiments arranged in the animal holding bay, and wherein the separating device is arranged in such a manner that a conveying direction of the upper run is directed in the direction of an inspection aisle, and/or of a disposal aisle, and/or of a boundary element. The separating device preferably extends over the entire width of the animal holding bay.

The animal holding bay preferably extends in the longitudinal direction from a first bay end to a second bay end. The separating device is preferably arranged in a region abutting the second bay end. Furthermore, preferably, the first bay end is spaced apart from the separating device by 5 meters to 7 meters, preferably 6 meters to 6.8 meters. Orthogonally with respect to the longitudinal direction, the animal holding bay preferably extends in the width direction by 2 meters to 3 meters, in particular 2.4 meters to 2.5 meters. The advancing direction of the endless belt of the separating device is preferably oriented parallel to the longitudinal direction. It has furthermore turned out to be advantageous for the separating device to extend substantially over the entire width direction.

In a preferred variant embodiment of the animal pen, it is provided that the latter comprises a disposal aisle, wherein a conveying plane of the upper run is arranged substantially in the same plane as the inspection aisle. Furthermore, it is preferred that the disposal aisle is arranged in the vertical direction under the inspection aisle, and the disposal aisle and the endless belt are arranged in such a manner that dung conveyed on the endless belt is conveyed into the disposal aisle.

According to a further preferred variant embodiment of the animal pen, it is provided that the latter comprises a first animal holding bay with a first separating device and a second animal holding bay with a second separating device, wherein the first separating device is arranged adjacent to the second separating device. Furthermore, the animal pen can have a third animal holding bay with a third separating device and a fourth animal holding bay with a fourth separating device, wherein the third separating device is arranged adjacent to the fourth separating device, and the first separating device and the second separating device abut a first side of the inspection aisle and the third separating device and the fourth separating device abut a second side of the inspection aisle opposite the first side.

Furthermore, the first separating device and the second separating device can abut the inspection aisle and the third separating device and the fourth separating device can abut a second inspection aisle, wherein the sides of the first and third animal holding bay facing away from the separating devices are preferably arranged on one another and/or the sides of the second and fourth animal holding bay facing away from the separating devices are arranged on one another.

In a preferred variant embodiment of the animal pen, it is furthermore provided that a drive drives the endless belt of the first separating device and the endless belt of the second separating device is coupled to the endless belt of the first separating device in such a manner that the endless belt of the second separating device is driven by the endless belt of the first separating device. The first separating device and/or the second separating device preferably comprises or comprise coupling elements for the previously mentioned coupling. Furthermore preferably, the animal pen comprises eight or sixteen, preferably more than eight or more than sixteen, separating devices, the endless belts of which are driven by a single drive. In particular, it is preferred that an individual drive drives the endless belts of two or more separating devices. The animal pen preferably comprises a multiplicity of animal holding bays and/or separating devices.

A further preferred development of the animal pen is distinguished in that the latter comprises a conveying means, which is arranged in the disposal aisle, for conveying dung. Said conveying means can be designed, for example, as a conveyor worm, conveyor belt, and/or as a dung pusher. Furthermore, a drinking trough can be arranged in such a manner that the drinking trough can be reached from the separating device by an animal and/or the drinking trough is arranged in a portion of the animal holding bay abutting the separating device and/or the drinking trough is fitted in the portion of the separating device.

A boundary element, for example, a boundary wall and/or a boundary gate, is preferably provided between the animal holding bay and the inspection aisle. A disposal opening can be arranged between the separating device and the inspection aisle in such a manner that dung conveyed on the endless belt passes into the disposal aisle. The disposal opening preferably has a clear height of less than 2 cm, of less than 3 cm, of less than 5 cm, of less than 10 cm, or greater than 10 cm in the vertical direction. Furthermore, it is preferred that the clear height of the disposal opening is adjustable, wherein this is advantageous, in particular, when keeping adolescent animals. Furthermore, it is preferred that the clear height of the disposal opening is reduced by a protective guard for piglets such that a piglet is prevented from entering the disposal aisle.

The animal pen preferably comprises a liquid conducting-away system. The latter is preferably designed as a pipeline system. Furthermore, the animal pen can comprise intermediate liquid stores which temporarily store the liquid collected by the separating device and can be emptied by means of a tank and/or pump. The pipelines preferably have a gradient of 1%. Furthermore, the pipeline system can be connected to a pump, as a result of which the gradient may not be required.

Furthermore, it is preferred that the animal pen has at least one pen sensor selected from the group consisting of pressure sensor, weight sensor, moisture sensor, pH sensor, conductivity sensor, flow rate sensor, presence sensor, in particular light barrier, motion detector and camera, ultrasonic sensor, transponder-based sensor, ammonia content sensor, air humidity sensor, and temperature sensor. The at least one pen sensor can be coupled to the control device of the drive of the separating device. Furthermore, a communication interface can be arranged on the separating device in order to communicate with the pen sensor.

According to a further aspect, the object mentioned at the beginning is achieved by a method for producing a separating device for separating dung and urine in an animal pen, comprising providing a base frame with a transverse drainage member, arranging a drainage element with a drainage channel which has an outflow end, and two shoulders between which the drainage channel extends orthogonally with respect to a drainage direction, arranging a liquid-permeable endless belt with an upper run and a lower run on the base frame such that the drainage element is arranged between the upper run and the lower run, fastening the drainage element to the base frame such that the outflow end is arranged on the transverse drainage member, wherein the drainage channels have an inclination in the direction of the outflow direction, and the lower side of the upper run facing away from a standing area for the animals rests at least in sections on at least one shoulder of the drainage element.

According to a further aspect, the object mentioned at the beginning is achieved by a method for separating dung and urine in an animal pen, comprising providing a movable and liquid-permeable floor, supporting the floor on drainage channels, trapping liquid in the drainage channels, conducting away the liquid in the longitudinal direction of the drainage channels and subsequently in the transverse direction. The method preferably comprises the step of collecting dung on the movable floor, wherein the dung is preferably conveyed.

According to a further aspect, the object mentioned at the beginning is achieved by a method for separating dung and urine in an animal pen, comprising providing a separating device according to at least one of the previously mentioned variant embodiments, activating a drive of the endless belt, wherein the endless belt is driven as a function of predefined cycles and/or times of the day and/or night, and/or sensor signals which in particular represent pressure values, and/or weight values, and/or moisture values, and/or pH values, and/or conductivity values, and/or flow rate values, and/or ammonia content values, and/or temperature values, and/or activating the drive and/or the dung scraper in such a manner that residual dung remains on the endless belt.

The method and the possible developments thereof have features and method steps which make them suitable, in particular, to be used for a separating device described here and the developments thereof. For further advantages, variant embodiments and embodiment details of said further aspects and of the possible developments thereof, reference is also made to the previous description of the corresponding features and developments of the separating device.

BRIEF DESCRIPTION OF THE DRAWINGS

Preferred exemplary embodiments will be explained by way of example with reference to the attached figures, in which.

DETAILED DESCRIPTION OF THE EMBODIMENTS

Identical or substantially functionally identical or similar elements are denoted by same reference signs in the figures.

Figure 1:
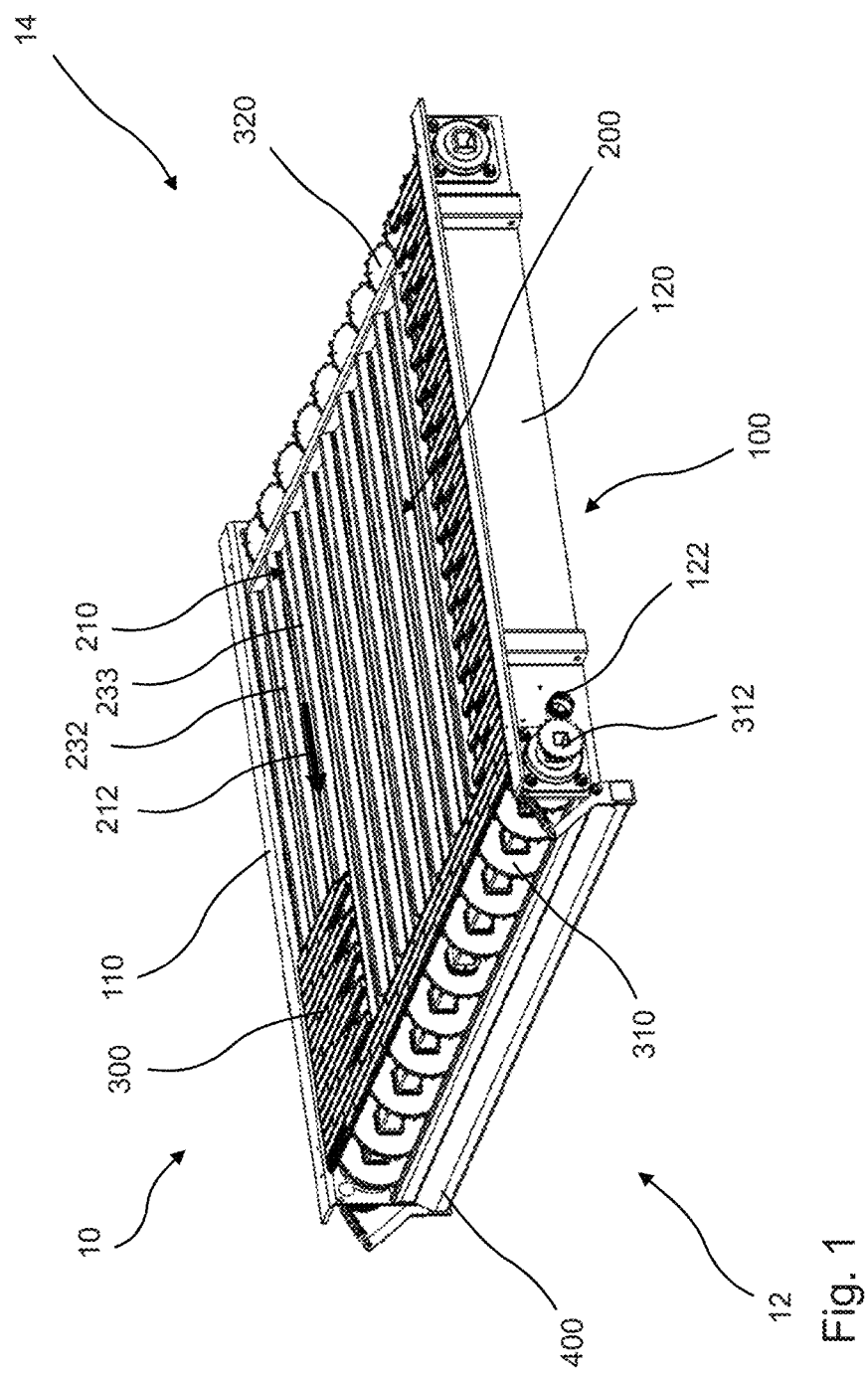
FIG. 1 is a schematic three-dimensional view of an exemplary embodiment of a separating device.
Figure 2:
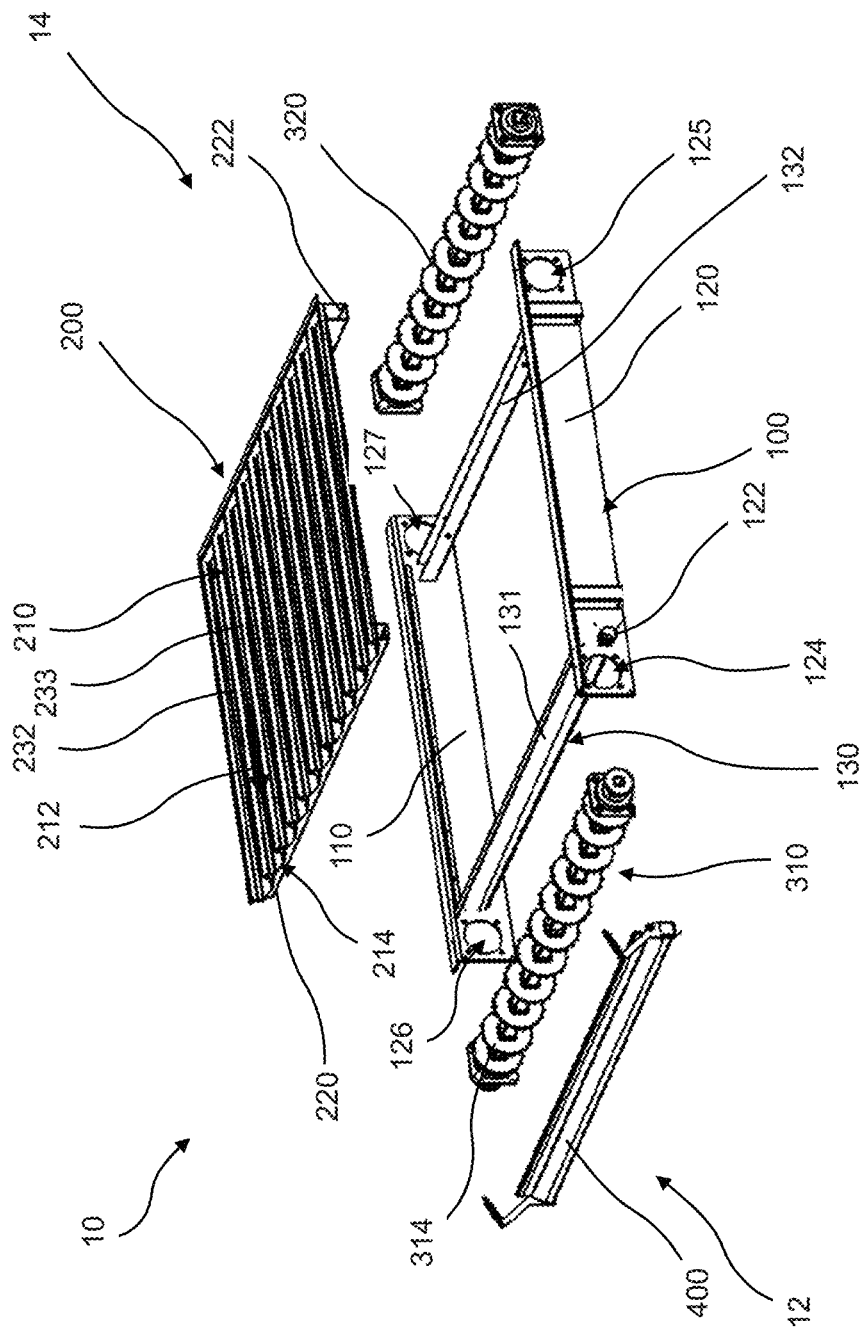
FIG. 2 is a schematic exploded drawing of the separating device from FIG. 1.

FIG. 1 shows a schematic three-dimensional view of an exemplary embodiment of a separating device. The separating device 10 extends from a first end 12 toward a second end 14. The separating device 10 comprises a base frame 100 into which a drainage element 200 is inserted. The base frame 100 is formed by a first longitudinal member 110, a second longitudinal member 120, a transverse drainage member 130, shown in FIG. 2, and a transverse support member 132. The transverse drainage member 130 and the transverse support member 132 are arranged substantially parallel. The longitudinal members 110, 120 are likewise arranged substantially parallel to each other. The longitudinal members 110, 120 and the transverse members 130, 132 are arranged at a right angle to one another.

The drainage element 200 is inserted into the base frame 100 formed by the first longitudinal member 110, the second longitudinal member 120, the transverse drainage member 130, and the transverse support member 132. The drainage element 200 comprises a multiplicity of drainage channels 210, wherein the multiplicity of drainage channels are connected to one another by a first supporting member 220 and a second supporting member 222. The structure of the drainage channel 210 will be explained here by way of example as a representative of the plurality of drainage channels. The drainage channel 210 is surrounded by a first shoulder 232 and a second shoulder 233. Each of the drainage channels extends from a first side of the drainage element, which side faces the first end 12 of the separating device 10, toward a second side, which side faces the second end 14 of the separating device 10. The drainage channels 210 are designed in such a manner that a liquid can flow into them. The drainage element 200 and the drainage channels 210 are designed in such a manner that, when the drainage element 200 is correctly arranged on the base frame 100, a drainage direction 212 is defined. When the drainage element 200 is correctly arranged, the drainage channels 210 have an inclination with respect to the horizontal. As a result, a liquid flows in the direction of the drainage direction 212, indicated by an arrow, toward an outflow end 214.

Passage openings 124, 125, 126, 127 are arranged in a region abutting against the respective ends of the longitudinal members 110, 120. The passage openings 124-127 are designed in such a manner that a first deflecting unit 310 and a second deflecting unit 320 can be arranged thereon or therein. It is particularly preferred for the transverse drainage member 130 and the transverse support member 132 to be arranged on the inner side of the deflecting units 310, 320. The deflecting units 310, 320 are arranged and designed in such a manner that they can guide an endless belt 300. The endless belt 300, which is illustrated broken open in FIG. 1, is liquid-permeable. The endless belt 300 surrounds the upper side and the lower side and also the end sides of the separating device 10. The endless belt 300 includes an upper run 302 and a lower run 304, as best shown in FIG. 3.

Figure 3:
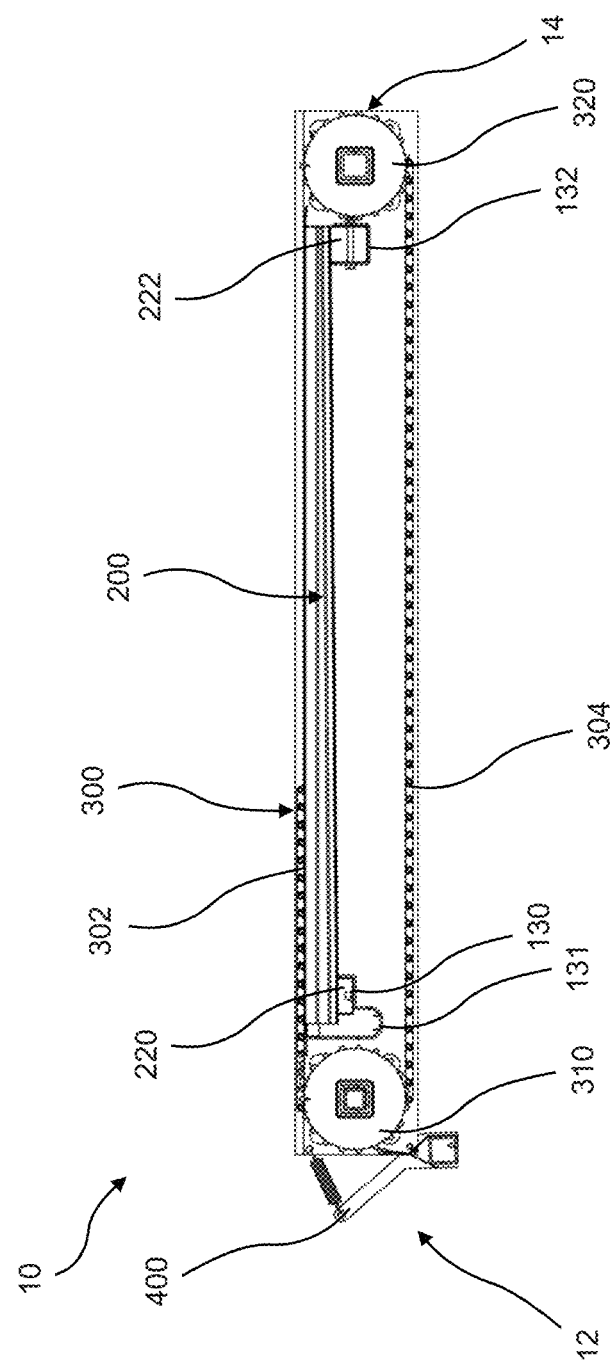
FIG. 3 is a schematic two-dimensional side view of the separating device from FIG. 1.

It is apparent, in particular in FIG. 3, how the drainage element 200 is arranged on the base frame 100. The transverse drainage member 130 and the transverse support member 132 have an upwardly open profile. The supporting members 220, 222 of the drainage element 200 have a profile corresponding to the upwardly open profile of the transverse drainage member 130 and transverse support member 132. As a result, the supporting members 220, 222 can be inserted into the upwardly open profiles of the transverse drainage member 130 and of the transverse support member 132.

The transverse support member 132 forms a fixed bearing in the direction from the first end 12 to the second end 14. The transverse drainage member 130 forms a movable bearing in the previously mentioned direction. In addition to the support for the first supporting member 220, the transverse drainage member 130 has a lower transverse drainage channel 131. Alternatively, the transverse drainage channel 131 can also be arranged as a separate element on the transverse drainage member 130. Furthermore, the transverse drainage channel 131 can also be arranged as a separate element on the drainage element 200 and/or on the base frame 100.

It is, in particular, apparent in FIG. 3 that a liquid located on the drainage element 200 flows in the drainage direction 212 because of the inclination of the drainage element 200. By means of the arrangement of the drainage element 200, the drainage direction 212 resulting from the inclination and also the arrangement of the transverse drainage channel 131, it becomes apparent that the liquid flows from the drainage element 200 into the transverse drainage channel 131. The transverse drainage channel 131 is connected to a drainage opening 122 in the first longitudinal member. As a result, a liquid flowing through the endless belt 300 can be received in the drainage element 200 by means of the drainage channels 210. The liquid flows in the drainage direction 212 into the transverse drainage channel 131 because of the inclination which arises. The transverse drainage channel 131 likewise preferably has an inclination in the direction of the drainage opening 122. A liquid can thus flow from the endless belt 300 to a liquid collecting station arranged outside the separating device.

Furthermore, a dung scraper 400 is arranged at the first end 12 of the separating device 10. The dung scraper 400 is intended to scrape dung located on the endless belt 300 from the latter during movement of said endless belt. By means of the scraping, the dung is intended to be arranged in a defined position under the separating device 10. It is preferred, in particular, for the dung scraper 400 to be configured or controlled in such a manner that the dung is not completely removed from the endless belt 300, but rather some of the dung remains thereon. In particular, it is preferred for this to be realized by means of an activation method. By the dung remaining on the endless belt 300, the separating device 10 is identified and noted by animals, in particular pigs, as a defection region in the pen. Consequently, the animals, in particular pigs, attempt to defecate on the separating device 10 and keep the rest of the pen substantially clean.

Figure 4:
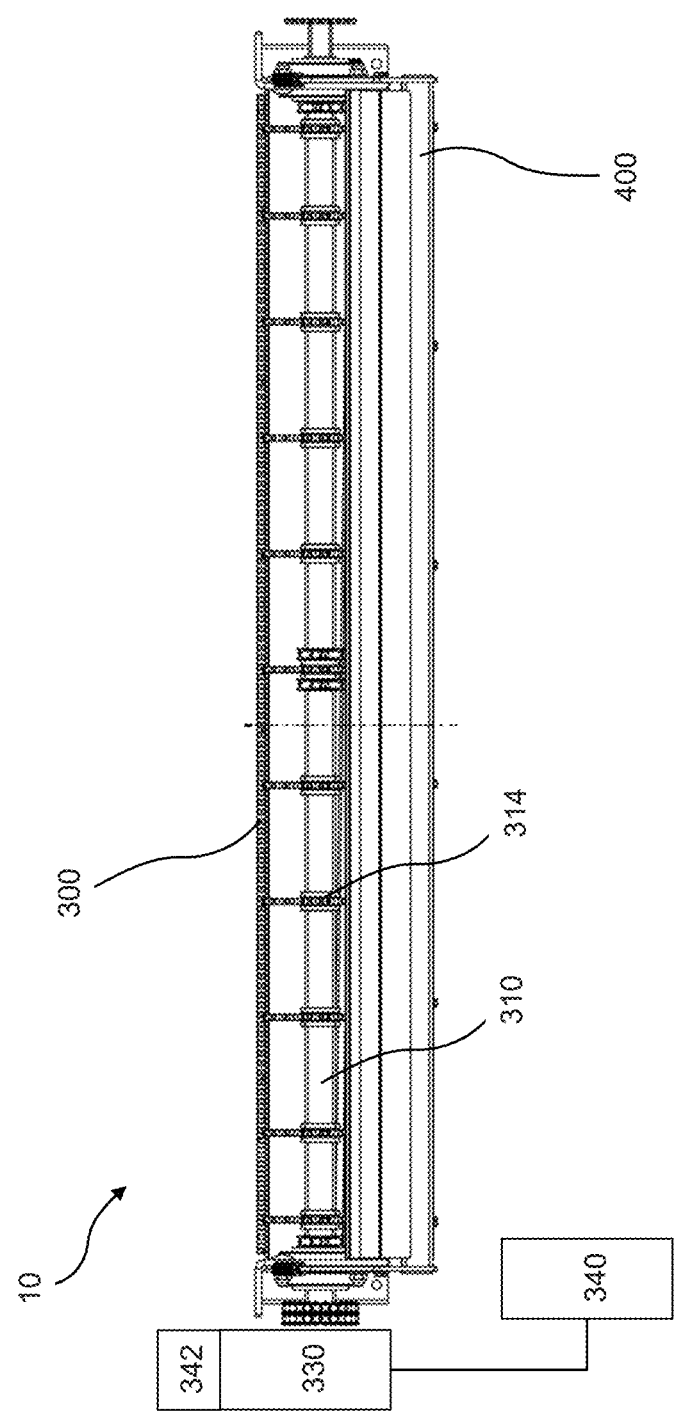
FIG. 4 is a schematic two-dimensional end view of the separating device from FIG. 1.

FIG. 4 shows a schematic two-dimensional end view of the separating device 10 from FIG. 1. It can be seen, in particular, that the first deflecting unit 310 has a plurality of deflecting pulleys 314. The deflecting pulleys 314 are designed in such a manner that they can set the endless belt 300 into movement. The deflecting pulleys 314 have a type of gearwheel structure with which they can form a form-fitting and/or force-fitting connection with the endless belt 300. Furthermore, the separating device 10 comprises a drive 330. The drive 330 is coupled to the first deflecting unit 310 via drive coupler 312 and drives the latter in a rotational manner. The drive 330 is coupled to a control device 340 which is arranged and designed to control the drive 330. For example, the control device 340 controls the drive 330 on a cycle basis. Consequently, the drive 330 can be activated, for example, at predefined time intervals and can set the endless belt 300 into movement. Furthermore, the control device 340 can also control the drive 330 in accordance with a day scheme, with rest times of the animals preferably being taken into consideration. Furthermore, the control device 340 can be designed to control the drive 330 on a sensor basis. For this purpose, the separating device preferably comprises at least one sensor 342.

Figure 5:
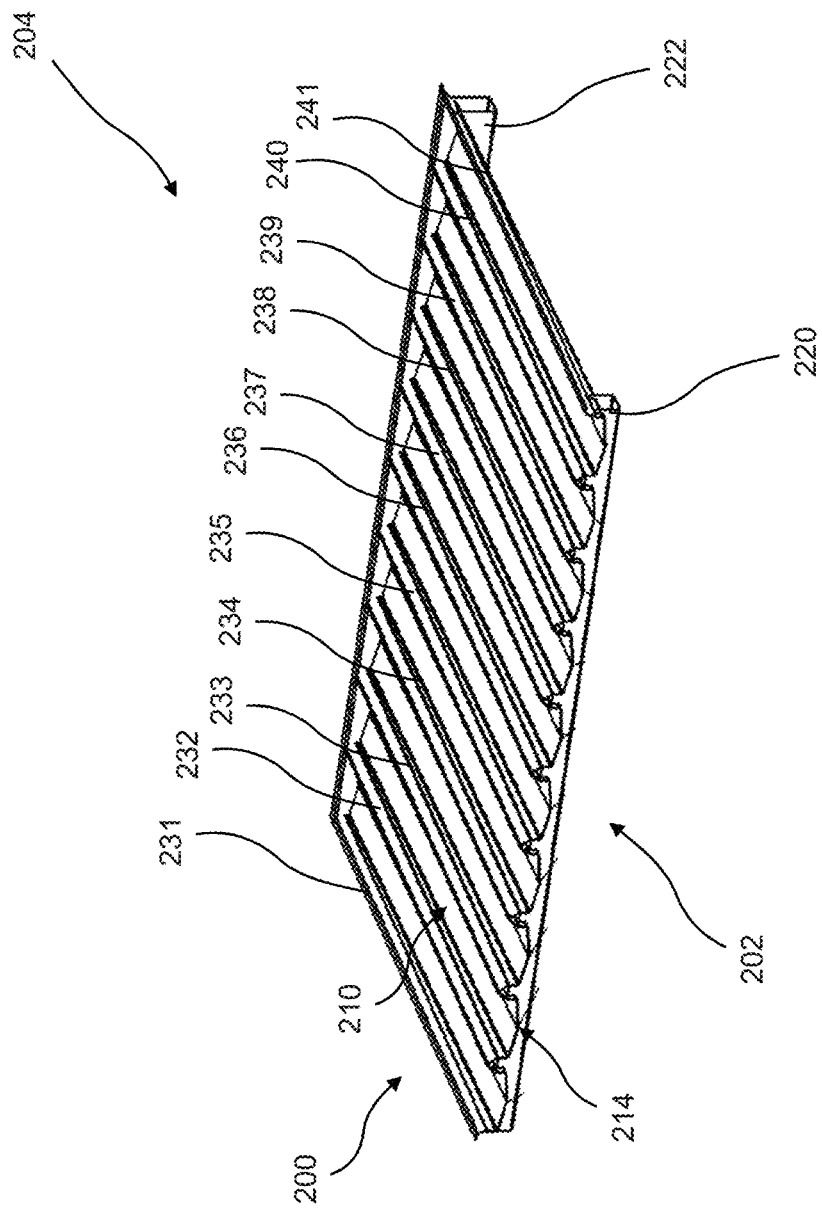
FIG. 5 is a schematic three-dimensional view of an exemplary embodiment of a drainage element.
Figure 6:
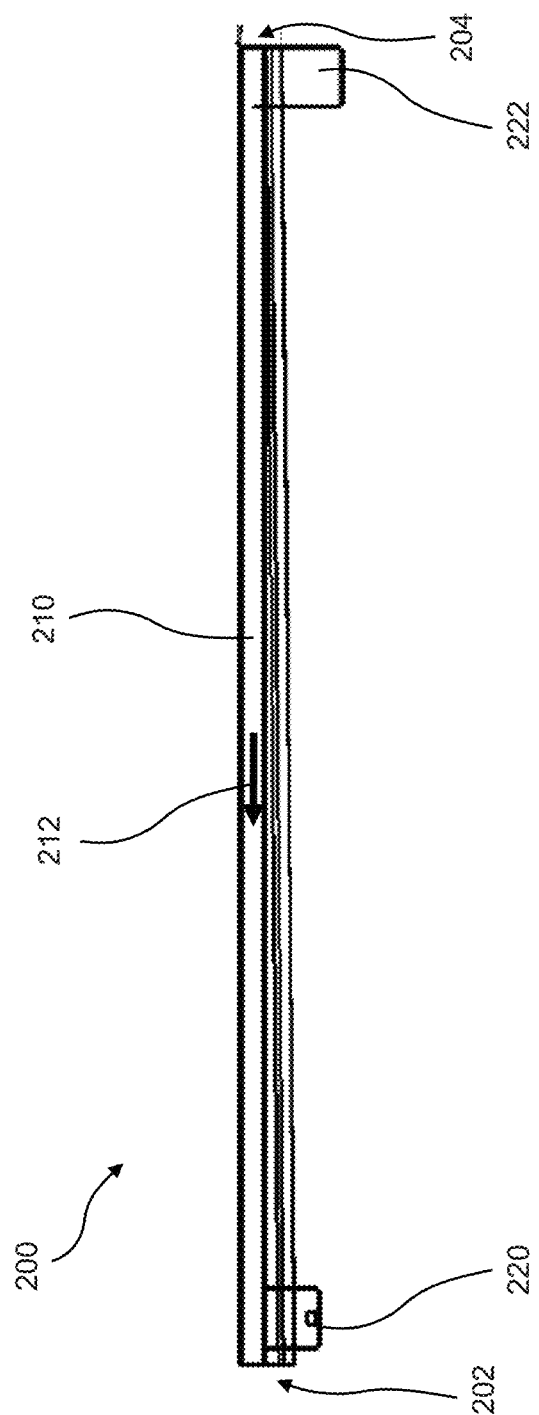
FIG. 6 is a schematic two-dimensional side view of the drainage element from FIG. 5.
Figure 7:
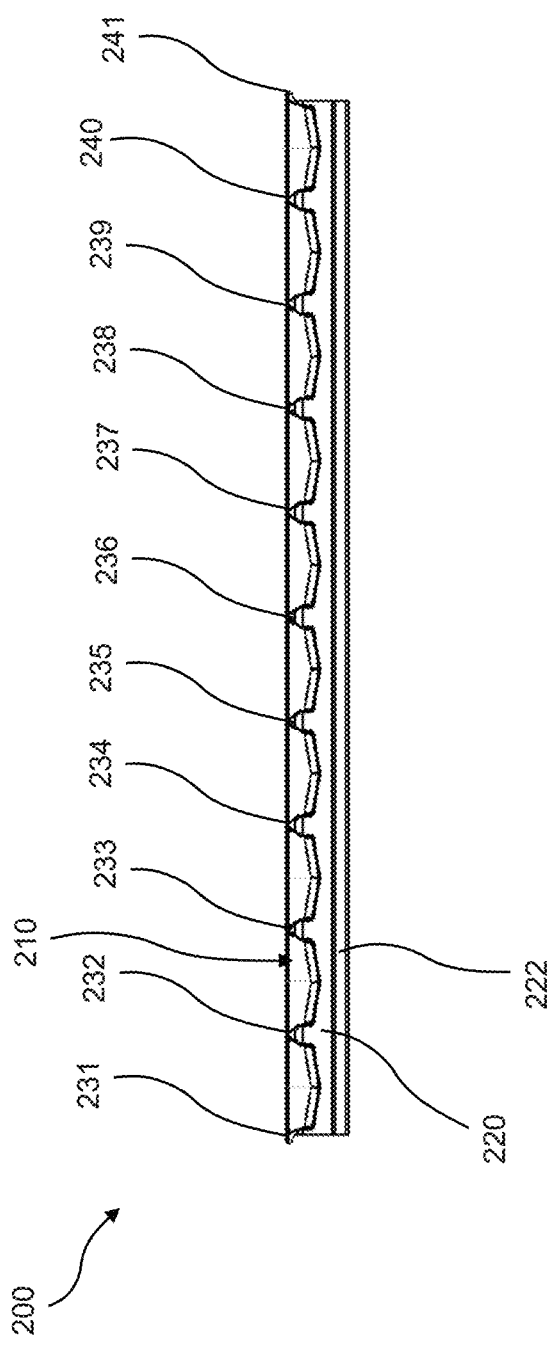
FIG. 7 is a schematic two-dimensional end view of the drainage element from FIG. 5.

FIGS. 5-7 show detailed views of the drainage element 200. FIGS. 5 and 7, in particular, show the design of the drainage element with a multiplicity of drainage channels, wherein a drainage channel with the reference sign 210 is provided as a representative of all of the other drainage channels, wherein the drainage channel 210 extends between two shoulders 232, 233. The shoulders 232-240 and the edge shoulders 231, 241 therefore form the lateral boundaries of the drainage channels.

The drainage element 200 extends from a blocking side 204 toward a drainage side 202. The drainage channels 210 are blocked by a rear wall on the blocking side 204. This means that a liquid in the drainage channel cannot drain on the blocking side 204 at least up to a defined filling height. The outflow ends 214 are arranged on the drainage side 202. The drainage side 202 is distinguished in respect of the drainage channels 210, in particular, in that a liquid in the drainage channels 210 can drain on the drainage side 202 in a manner substantially free from interference.

It becomes apparent from FIG. 6 how the drainage direction 212 of the drainage element 200 is realized. The first supporting member 220 has a smaller extent in the vertical direction than the second supporting member 222. Since the transverse drainage member 130 and the transverse support member 132 are arranged at the same height in the vertical direction on the longitudinal members 110, 120, an inclination of the drainage element 200 relative to the base frame 100 arises by means of the supporting members 220, 222 of different length. The base frame 100 is positioned substantially horizontally by means of feet, not shown, such that, as a result thereof, the drainage element 200 has an inclination.

Figure 8:
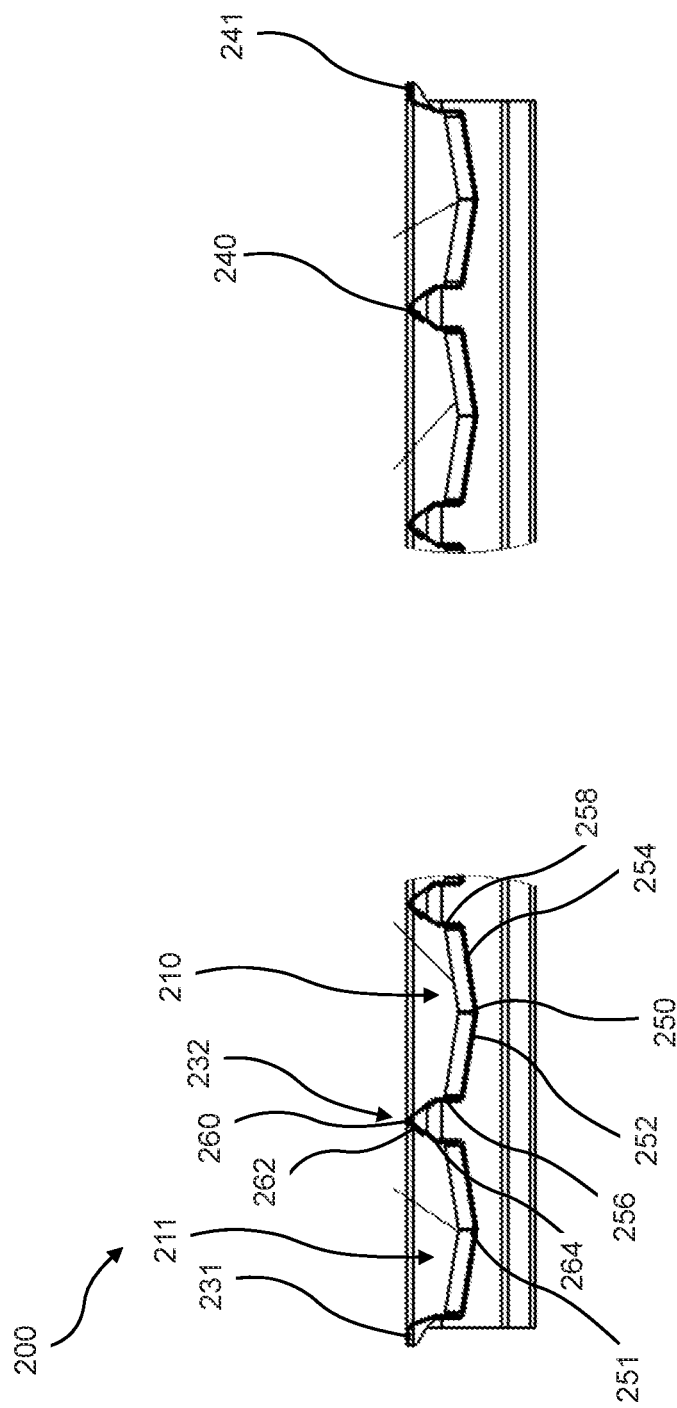
FIG. 8 is a schematic two-dimensional detailed views of drainage channels of the drainage element shown in FIG. 5.

FIG. 8 shows schematic two-dimensional detailed views of drainage channels 210 of the drainage element 200 shown in FIG. 5. The exemplary design of a drainage channel will be explained by way of example with reference to the drainage channel 210. The drainage channel 210 has a channel base 250 that includes a bead 251. The channel base 250 is the deepest point of the drainage channel 210 in the vertical direction. From the channel base 250, a first channel floor wing 252 and a second channel floor wing 254 extend away from the channel base 250. The channel floor wings 252, 254 have a slope. As a result, a liquid flowing into the drainage channel always flows in the direction of the channel base 250. A channel side wall 256, 258 is arranged in each case at the outer ends of the channel floor wings 252, 254. A channel floor wing 252, 254 together with a channel side wall 256, 258 forms a leg of the drainage channel 210.

It is particularly advantageous if the drainage channel 210 is produced from a metal, as a result of which the drainage channel 210 can be readily formed. For example, the first shoulder 232 is formed by the sheet metal of the drainage channel 210 and the sheet metal of the second drainage channel 211. At the highest point of the first shoulder 232, the side walls 256 and 264 butt against each other. The side wall 256 has a greater extent than the side wall 264. The greater extent at this point, which goes beyond that of the customary extent, is referred to as an edge portion 262. The edge portion 262 is buckled away from the side wall 256 at the kink 260. As a result, the sheet metal of the drainage channel 210 in the form of the channel side wall 256 and the edge portion 262 lies above the channel side wall 264 of the adjacent second drainage channel 211. A liquid-tight connection of the drainage channel 210 and of the second drainage channel 211 is thereby formed.

The design of the first edge shoulder 231 and of the second edge shoulder 241 is likewise shown in FIG. 8. The edge shoulders 231, 241 are formed by edge portions. Said edge portions are bent from the rest of the material of the drainage channels 210 in such a manner that they form a horizontal support. The drainage element 200 can be arranged by means of said horizontal support in addition to the supporting members 220, 222 on the base frame 100, in particular, on the longitudinal members 110, 120.

Figure 9:
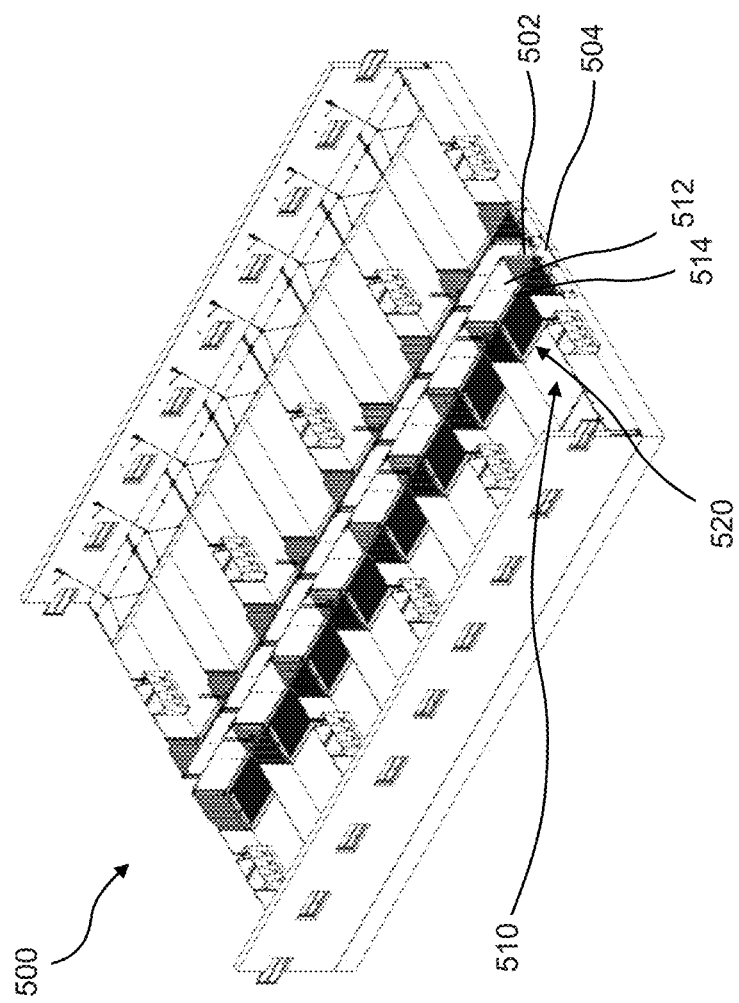
FIG. 9 is a schematic three-dimensional view of an animal pen with a plurality of separating devices shown in FIG. 1.

FIG. 9 shows a schematic three-dimensional view of an animal pen with a plurality of separating devices 520 shown in FIG. 1. The animal pen 500 comprises an inspection aisle 502 arranged centrally in the longitudinal direction. A disposal aisle 504 is arranged parallel and in the vertical direction under the inspection aisle 502. A plurality of animal holding bays 510 are arranged on both sides along the inspection aisle 502. The animal holding bays 510 each extend from the inspection aisle 502 toward an outer wall 506, 508 of the animal pen 500. A separating device 520 is in each case arranged in the animal holding bays 510. The separating device 520 butts against the inspection aisle 502. Furthermore, the separating device 520 extends over the entire side of the animal holding bay 510, which side extends parallel to the inspection aisle 502. The animal holding bay 510 is delimited from the inspection aisle 502 by a boundary wall 512. A disposal gap 514 is located between the boundary wall 512 and the separating device 520. As a result, dung located on the endless belt of the separating device 520 can be disposed of through the disposal gap 514 by being conveyed in the direction of the inspection aisle 502. The dung is conveyed, in particular, through the disposal gap 514 into the disposal aisle 504. Suitable devices can be arranged within the disposal aisle 504 in order to dispose of the dung from here.

Figure 10:
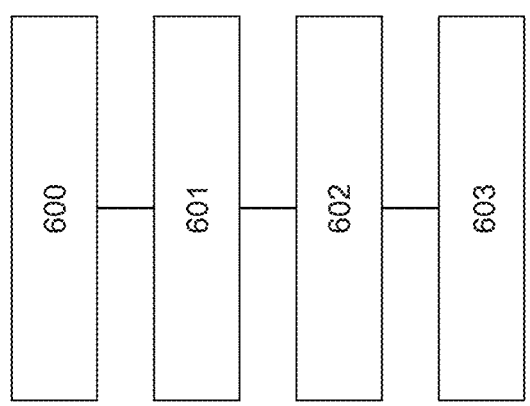
FIG. 10 is a schematic sequence diagram of an exemplary embodiment of the method for separating dung and urine in an animal pen.

FIG. 10 shows a schematic sequence diagram of an exemplary embodiment of the method for separating dung and urine in an animal pen. In a first step 600, a movable and liquid-permeable floor is provided. Such a floor can be designed, for example, as an endless belt and preferably as a module belt. The liquid discharged by animals on the floor, in particular urine, is trapped in drainage channels in step 601. The liquid passes through the floor and is trapped in the drainage channels below the floor. The floor is supported on the drainage channels 210.

In step 602, the liquid is conducted away in the longitudinal direction of the drainage channels 210. Furthermore, in step 603, the liquid, after being conducted away in the longitudinal direction, is conducted away in the transverse direction. The liquid can flow, for example, at an outflow end of the drainage channels 210, into a transverse channel which is arranged orthogonally with respect to the drainage channels. Furthermore, the method can comprise the step of collecting dung on the movable floor.

The separating device has the advantage that an autonomous separating device is provided for animal pens, which separates the liquid and solid excrement from animals, in particular pigs. Furthermore, the present separating device affords the advantage that an endless belt can be used which is particularly appropriate for the animal welfare and furthermore has optimum permeability to liquid excrement. This is achieved, in particular, by the fact that the endless belt 300 itself does not have to carry the weight of an animal. This, in turn, results from the fact that the endless belt rests on the shoulders of the drainage element 200. The shoulders form an internal support for the endless belt.

The invention claimed is:

1. A separating device for forming a standing area for livestock and for reducing emissions in pens, the separating device comprising:
   a base frame;
   a drainage element having a plurality of adjacent drainage channels each comprising an outflow end and a plurality of shoulders between which the plurality of drainage channels extends orthogonally to a drainage direction;
   a liquid-permeable endless belt with an upper run and a lower run; and
   a one of the plurality of shoulders between a first drainage channel of the plurality of drainage channels and a second drainage channel of the plurality of drainage channels is formed by a first edge portion of the first drainage channel and a second edge portion of the second drainage channel, and the first edge portion is arranged above the second edge portion, and wherein the first edge portion or the second edge portion is buckled or bent along a longitudinal direction;
   wherein the drainage element is arranged on the base frame such that a drainage direction of the plurality of drainage channels is directed in the direction of the outflow end, and the outflow end is positioned such that a liquid flowing out of the outflow end reaches a transverse drainage channel, and wherein the drainage element is arranged between the upper run and the lower run, and the upper run rests on at least a one of the plurality of shoulders, wherein the upper run serves as a standing area for animals.

2. A separating device for forming a standing area for livestock and for reducing emissions in pens, the separating device comprising:
   a base frame;
   a drainage element having a plurality of adjacent drainage channels each comprising an outflow end and a plurality of shoulders between which the plurality of drainage channels extends orthogonally to a drainage direction;
   a transverse drainage member, wherein the transverse drainage member acts as a first support for the drainage element; and a liquid-permeable endless belt with an upper run and a lower run;

wherein the drainage element if arranged on the base frame such that a drainage direction of the plurality of drainage channels is directed in the direction of the outflow end, and the outflow end is positioned such that a liquid flowing out of the outflow end reaches a transverse drainage channel, and wherein the drainage element is arranged between the upper run and lower run, and the upper run rests on at least a one of the plurality of shoulders, wherein the upper run serves as a standing area for animals.

3. The separating device pursuant to claim 2, wherein the base frame has a transverse support member, and wherein the transverse support member acts as a second support for the drainage element.

4. The separating device pursuant to claim 3, wherein the base frame further comprises a first longitudinal member and a second longitudinal member, and the transverse drainage member and the transverse support member are each arranged on the first longitudinal member and on the second longitudinal member.

5. The separating device pursuant to claim 2, wherein the liquid-permeable endless belt comprises a module belt with a multiplicity of modules arranged on one another, has a degree of opening of 2%-10%, and has a gap size of 0.2 mm to 1.0 mm in a substantially rectilinear portion of the liquid-permeable endless belt.

6. The separating device pursuant to claim 2, wherein the transverse drainage channel is arranged on the drainage element, and the liquid located in the plurality of drainage channels flows into the transverse drainage channel.

7. The separating device pursuant to claim 2, wherein the transverse drainage channel is arranged on and is formed integrally with the transverse drainage member.

8. The separating device pursuant to claim 2, wherein the transverse drainage channel is arranged in an inclined manner.

9. The separating device pursuant to claim 2, wherein a substantially flat portion of the upper run of the liquid-permeable endless belt delimits the standing area for livestock and the drainage element extends substantially under the standing area for livestock.

10. The separating device pursuant to claim 2, wherein the base frame extends from a first end to a second end and a first deflecting unit is arranged at the first end and a second deflecting unit is arranged at the second end, and wherein the liquid-permeable endless belt loops around the first deflecting unit and the second deflecting unit.

11. The separating device pursuant to claim 1, wherein each of the plurality of drainage channels have a channel cross section orthogonally with respect to the drainage direction and the channel cross section has a U-shaped profile;
the plurality of drainage channels have a bead in the drainage direction; and
the U-shaped profile has a radius of smaller than 400 mm.

12. The separating device pursuant to claim 1, wherein each of the plurality of drainage channels have a channel cross section orthogonally with respect to the drainage direction and the channel cross section has a V-shaped profile;
the plurality of drainage channels have a bead in the drainage direction; and
the V-shaped profile has an inner opening angle of smaller than 180 arc degrees.

13. The separating device pursuant to claim 1, wherein a first outer drainage channel of the plurality of drainage channels faces the first longitudinal member with a first outer edge portion, and a second outer drainage channel of the plurality of drainage channels faces the second longitudinal member with a second outer edge portion; and
the first outer edge portion or the second outer edge portion is disposed to rest on the first longitudinal member or the second longitudinal member, wherein the first outer edge portion or the second outer edge portion is buckled or bent over.

14. The separating device pursuant to claim 1, further comprising:
a control device to control a drive of the liquid-permeable endless belt; and
at least one sensor, selected from the group consisting of:
a pressure sensor,
a weight sensor,
a moisture sensor,
a pH sensor,
a conductivity sensor,
a flow rate sensor,
a presence sensor comprising a light barrier, a motion detector or a camera,
an ultrasonic sensor,
a transponder-based sensor,
an ammonia content sensor,
an air humidity sensor, and
a temperature sensor;
wherein the control device controls the drive as a function of one or more sensor signals from one or more of the sensors.

15. The separating device pursuant to claim 1, further comprising at least one cleaning nozzle disposed to convey a liquid onto the lower run of the liquid-permeable endless belt, wherein the cleaning nozzle is arranged on the drainage element; and
at least one cleaning nozzle disposed to convey a liquid onto a lower side of the upper run of the liquid-permeable endless belt.

16. An animal pen comprising:
at least one animal holding bay;
a separating device comprising:
a base frame;
a drainage element having a plurality of drainage channels each comprising an outflow end and a plurality of shoulders between which the plurality of drainage channels extends orthogonally to a drainage direction; and
a liquid-permeable endless belt with an upper run and a lower run;
wherein the drainage element is arranged on the base frame such that a drainage direction of the plurality of drainage channels is directed in the direction of the outflow end, and the outflow end is positioned such that a liquid flowing out of the outflow end reaches a transverse drainage channel, and wherein the drainage element is arranged between the upper run and the lower run, and the upper run rests on at least a one of the plurality of shoulders, wherein the upper run serves as a standing area for animals;
wherein the separating device is arranged such that a conveying direction of the upper run is directed in the direction of one or more of an inspection aisle, a disposal aisle, or a boundary element and the separating device extends over the entire width of the animal holding bay;

wherein the animal pen further comprises the inspection aisle and the disposal aisle, and the separating device is arranged such that a conveying direction of the upper run of the liquid-permeable endless belt is directed in the direction of the inspection aisle and the disposal aisle, and a conveying plane of the upper run of the liquid-permeable endless belt is arranged substantially in the same plane as the inspection aisle; and wherein the disposal aisle is arranged in the vertical direction under the inspection aisle, and the disposal aisle and the liquid-permeable endless belt are arranged in such a manner that dung conveyed on the liquid-permeable endless belt is conveyed into the disposal aisle.

17. The animal pen pursuant to claim 16, further comprising:

the inspection aisle;

a first animal holding bay with a first separating device and a second animal holding bay with a second separating device, wherein the first separating device is arranged adjacent to the second separating device;

a third animal holding bay with a third separating device and a fourth animal holding bay with a fourth separating device, wherein the third separating device is arranged adjacent to the fourth separating device;

wherein the first separating device and the second separating device abut a first side of the inspection aisle and the third separating device and the fourth separating device abut a second side of the inspection aisle opposite the first side; or wherein the first separating device and the second separating device abut a first inspection aisle and the third separating device and the fourth separating device abut a second inspection aisle, wherein a side of the first and third animal holding bay facing away from the separating devices is arranged on each other or a side of the second and fourth animal holding bay facing away from the separating devices.

18. A method for separating dung and urine in an animal pen comprising a separating device having a base frame, a drainage element having a plurality of adjacent drainage channels each comprising an outflow end and a plurality of shoulders between which the plurality of drainage channels extends orthogonally to a drainage direction, wherein a one of the plurality of shoulders between a first drainage channel of the plurality of drainage channels and a second drainage channel of the plurality of drainage channels is formed by a first edge portion of the first drainage channel and a second edge portion of the second drainage channel, and the first edge portion is arranged above the second edge portion, and wherein the first edge portion or the second edge portion is buckled or bent along a longitudinal direction, and a liquid-permeable endless belt with an upper run and a lower run, wherein the drainage element is arranged on the base frame such that a drainage direction of the plurality of drainage channels is directed in the direction of the outflow end, and the outflow end is positioned such that a liquid flowing out of the outflow end reaches a transverse drainage channel, wherein the drainage element is arranged between the upper run and the lower run, and the upper run rests on at least a one of the plurality of shoulders, wherein the upper run serves as a standing area for animals; the method comprises the steps of:

providing a movable, liquid-permeable floor defined by the upper run of the liquid-permeable endless belt;

supporting the floor on at least one of the plurality of shoulders between each of which extends one of two or more drainage channels each having a drainage end orthogonal to a drainage direction;

trapping the liquid in the plurality of drainage channels;

conducting the liquid away in a longitudinal direction of the drainage channels and subsequently in the transverse direction; and collecting dung from the movable floor.

\* \* \* \* \*

UNITED STATES PATENT AND TRADEMARK OFFICE
CERTIFICATE OF CORRECTION

| | |
|---|---|
| PATENT NO. | : 11,696,564 B2 |
| APPLICATION NO. | : 16/658712 |
| DATED | : July 11, 2023 |
| INVENTOR(S) | : Ernst |

It is certified that error appears in the above-identified patent and that said Letters Patent is hereby corrected as shown below:

In the Claims

Column 19, Claim 2, Line 3, "if" should be --is--; and

Column 19, Claim 2, Line 9, after "and" insert --the--.

Signed and Sealed this
Second Day of January, 2024

Katherine Kelly Vidal
*Director of the United States Patent and Trademark Office*